United States Patent
Lopez et al.

(10) Patent No.: US 10,640,214 B2
(45) Date of Patent: May 5, 2020

(54) PAYLOAD RELEASE APPARATUS

(71) Applicant: volans-i, Inc, San Francisco, CA (US)

(72) Inventors: Manuel Lopez, Richmond, CA (US); Hannan Parvizian, San Francisco, CA (US); Peter Staffe, San Francisco, CA (US); Jaipal Singh Khaira, San Francisco, CA (US)

(73) Assignee: volans-i, Inc, San Francisco, CA (US)

( * ) Notice: Subject to any disclaimer, the term of this patent is extended or adjusted under 35 U.S.C. 154(b) by 0 days.

(21) Appl. No.: 16/104,908

(22) Filed: Aug. 19, 2018

(65) Prior Publication Data

US 2020/0055600 A1 Feb. 20, 2020

(51) Int. Cl.
*B64D 1/12* (2006.01)
*B64C 39/02* (2006.01)

(52) U.S. Cl.
CPC .............. *B64D 1/12* (2013.01); *B64C 39/024* (2013.01); *B64C 2201/128* (2013.01)

(58) Field of Classification Search
CPC . B64D 1/12; B64C 2201/128; Y01T 282/081; Y01T 282/0813; Y01T 282/082; Y01T 282/0826; Y01T 282/0832; Y01T 282/0849; Y01T 282/0859; Y01T 282/0883; Y01T 282/0894; Y01T 282/0895; Y01T 282/0901; Y01T 282/0933; Y01T 282/0943; Y01T 282/106; Y01T 282/1071; Y01T 282/1082; Y01T 282/20; Y01T 282/202; Y01T 282/225; E05C 3/06; E05C 3/10; E05C 3/16; E05C 3/165; E05C 3/167; E05C 9/00; E05C 9/002; E05C 9/04; E05C 9/046; E05C 9/048; E05B 47/023; B65D 45/16; B65D 45/28; B65D 45/00; B65D 43/26; B65F 1/1615; B65F 2210/148

See application file for complete search history.

(56) References Cited

U.S. PATENT DOCUMENTS

| | | | | |
|---|---|---|---|---|
| 4,534,488 A * | 8/1985 | Boggs | ................ | B65D 43/0222 220/318 |
| 4,691,840 A * | 9/1987 | Ferbrache | .......... | B65D 25/2852 220/318 |
| 5,699,929 A * | 12/1997 | Ouno | .................... | B65F 1/1615 220/323 |
| 6,902,081 B2 * | 6/2005 | Walker | .................. | B65F 1/1615 220/315 |
| 9,174,733 B1 * | 11/2015 | Burgess | .................... | B64D 1/12 |
| 9,243,427 B2 * | 1/2016 | Weber | ................ | E05B 47/0009 |
| 9,321,531 B1 * | 4/2016 | Takayama | ................ | B64D 1/12 |
| 9,536,216 B1 * | 1/2017 | Lisso | ................. | G06Q 10/0832 |
| 9,630,715 B2 * | 4/2017 | Takayama | ................ | B64D 1/12 |
| 9,676,481 B1 * | 6/2017 | Buchmueller | ........... | B64D 1/12 |

(Continued)

*Primary Examiner* — Philip J Bonzell
(74) *Attorney, Agent, or Firm* — Cognition IP, P.C.; Bryant Lee

(57) ABSTRACT

A payload apparatus for selectively releasing a payload is disclosed. The payload apparatus may be used to deliver payloads from an aircraft such as an unmanned aerial vehicle. Embodiments of the payload apparatus include a payload container and a matching lid. The payload container may include one or more latches configured to engage the lid, and the lid may include one or more actuators to selectively disengage the one or more latches, thus releasing the payload container.

19 Claims, 4 Drawing Sheets

(56) References Cited

U.S. PATENT DOCUMENTS

| | | | | |
|---|---|---|---|---|
| 9,688,404 | B1* | 6/2017 | Buchmueller | B64D 1/12 |
| 9,714,012 | B1* | 7/2017 | Hoareau | B60S 5/06 |
| 9,817,396 | B1* | 11/2017 | Takayama | G05D 1/0038 |
| 9,969,494 | B1* | 5/2018 | Buchmueller | B64D 47/08 |
| 10,040,370 | B2* | 8/2018 | Wei | B60L 50/64 |
| 10,071,804 | B1* | 9/2018 | Buchmueller | B64C 39/024 |
| 10,131,437 | B1* | 11/2018 | Hanlon | B64D 1/12 |
| 10,232,938 | B2* | 3/2019 | Yates | B64C 39/024 |
| 2004/0065666 | A1* | 4/2004 | Walker | B65F 1/1615 |
| | | | | 220/315 |
| 2007/0175898 | A1* | 8/2007 | Craft | B65F 1/1468 |
| | | | | 220/324 |
| 2012/0187128 | A1* | 7/2012 | Weber | E05B 47/0009 |
| | | | | 220/324 |
| 2015/0158587 | A1* | 6/2015 | Patrick | B64C 39/024 |
| | | | | 244/137.4 |
| 2016/0340006 | A1* | 11/2016 | Tang | B63C 9/01 |
| 2017/0001724 | A1* | 1/2017 | Yates | B64C 39/024 |
| 2017/0267347 | A1* | 9/2017 | Rinaldi | B64D 1/22 |
| 2017/0334561 | A1* | 11/2017 | Sopper | B64D 1/22 |
| 2018/0095464 | A1* | 4/2018 | Takayama | G05D 1/0038 |
| 2018/0244389 | A1* | 8/2018 | Herlocker | B64D 1/08 |
| 2018/0312252 | A1* | 11/2018 | Yates | B64C 31/02 |
| 2019/0061944 | A1* | 2/2019 | Zvara | B64D 9/00 |

* cited by examiner

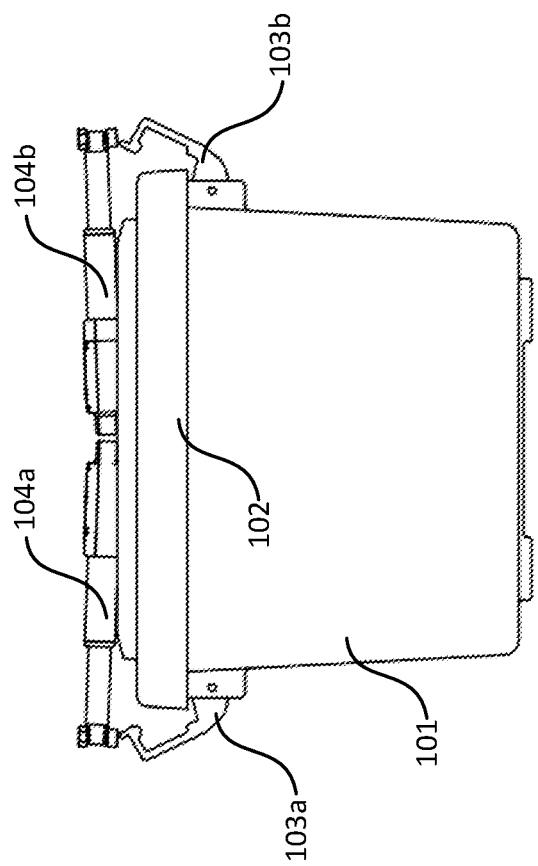
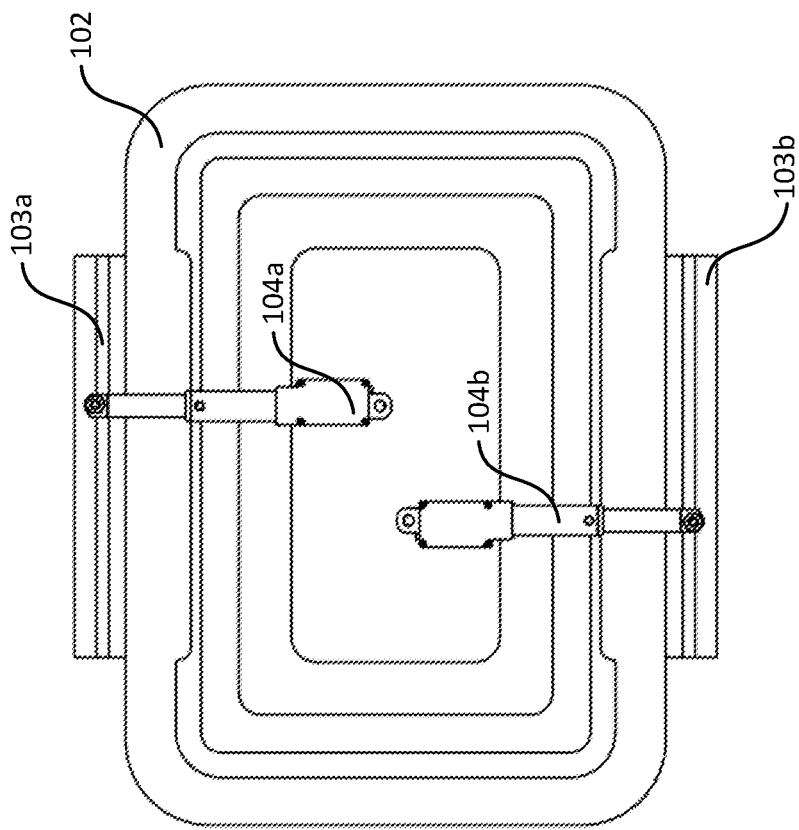
FIG. 2B
FIG. 2A

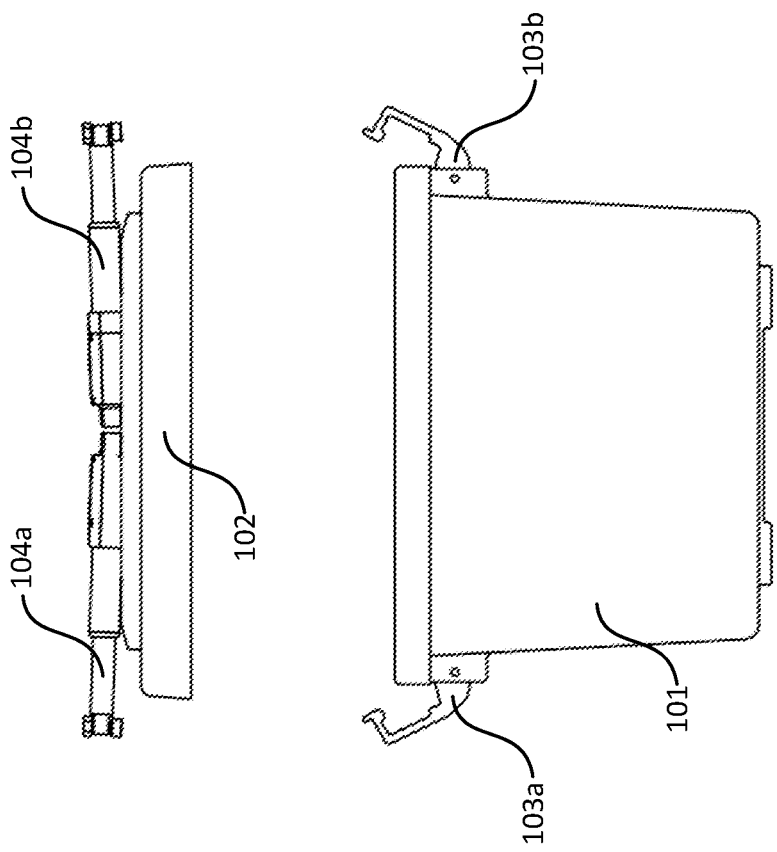
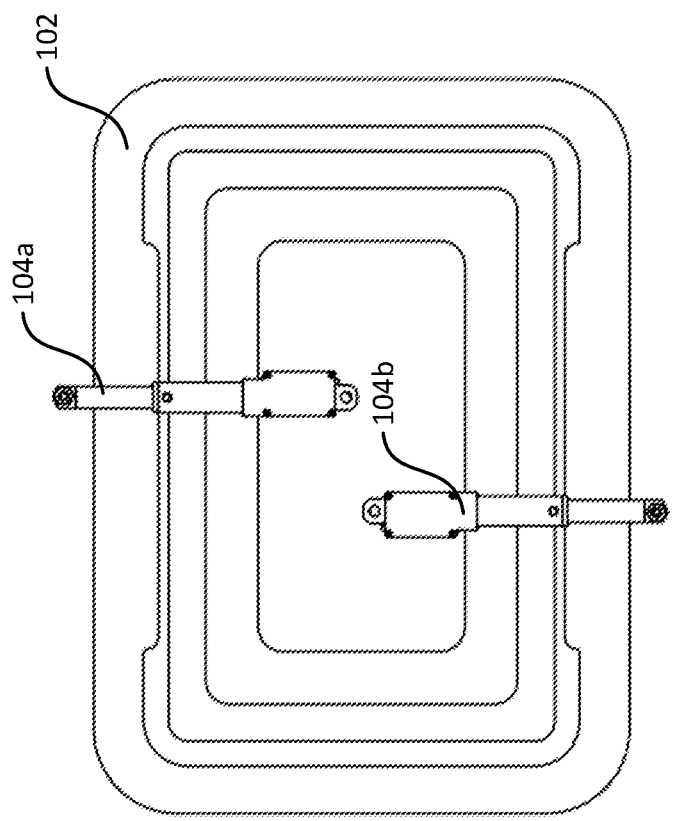
FIG. 3B
FIG. 3A

PAYLOAD RELEASE APPARATUS

FIELD

The present disclosure relates to drone delivery systems, and more specifically to an apparatus for releasing a payload from a drone aircraft.

BACKGROUND

An unmanned vehicle, which may also be referred to as an autonomous vehicle, is a vehicle capable of travel without a physically-present human operator. An unmanned vehicle may operate in a remote-control mode, in an autonomous mode, or in a partially autonomous mode. Unmanned aerial vehicles (UAVs), such as drones, are used in a wide variety of applications. For example, drones may be used to transport materials or goods from one location to another.

SUMMARY

Described herein are embodiments of a payload apparatus for selectively releasing a payload. The payload apparatus described may be used to release a payload from an aircraft as part of a drone-based delivery system, for example.

Embodiments of the payload apparatus include a payload container and a matching lid. The lid may be fixedly attached to a device from which the payload container is to be released from. The payload container includes one or more latches configured to engage the lid, and the lid include one or more actuators to disengage the latches, thus releasing the payload container.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein:

FIGS. 2A-B illustrate the example payload apparatus in an unlatching configuration;

FIGS. 3A-B illustrate the example payload apparatus in an unlatched configuration.

DETAILED DESCRIPTION

Figure 1B:
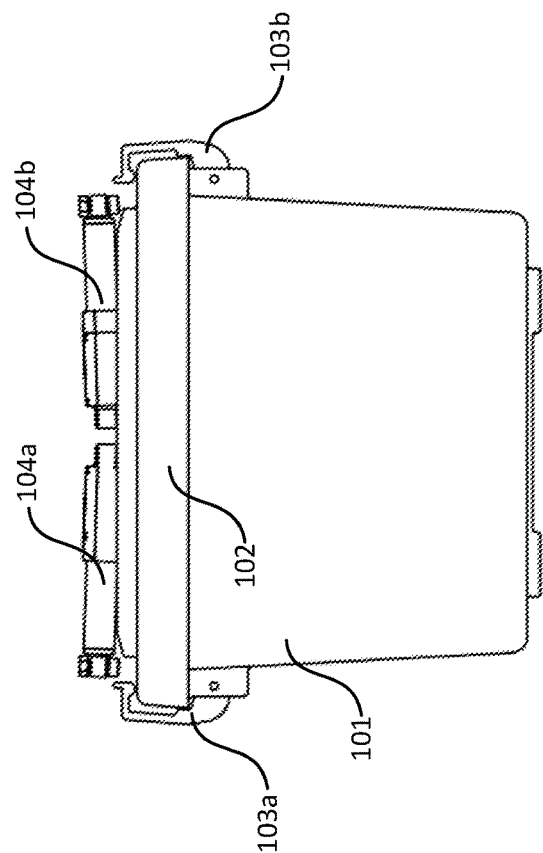
FIGS. 1A-B illustrate an example payload apparatus in a latched configuration.

Example embodiments may relate to and/or be implemented in a system in which unmanned vehicles, and in particular, "unmanned aerial vehicles" (UAVs), are configured to deliver payloads at delivery locations. UAVs in such a system may operate in an autonomous or semi-autonomous delivery system in which the UAV carries a payload from a first location, such as a distribution center, to a delivery location, such as a residence or business. At the distribution center, the UAV can be loaded with the payload to be delivered, and then the UAV can navigate to the delivery location. The UAV can then land or hover at the delivery location to deliver the payload.

FIGS. 1-3 illustrate an example payload apparatus progressing through three configurations. FIG. 1 illustrates an example payload apparatus in a latched configuration, FIG. 2 illustrates the example payload apparatus in an unlatching configuration, and FIG. 3 illustrates the example payload apparatus in an unlatched configuration. The payload apparatus progresses through these three configurations during the release of a payload.

The payload apparatus includes payload container 101 and lid 102. Lid 102 is dimensioned to cover a top side of payload container 101. In this example, the payload container and lid are rectangular in shape, however other embodiments may have different shaped and sized payload containers and lids. For example, some embodiments may have a circular, square, rectangular, trapezoidal, or triangular shaped payload container and lid. In an embodiment, payload container 101 may be approximately 10 inches in width, 6.5 inches in height, and 20 inches in length. In another embodiment, payload container 101 may be approximately 10 inches in width, 8.5 inches in height, and 20 inches in length. In an embodiment, the width of the payload container is approximately 1-20 inches, 1-10 inches, 5-20 inches, 5-15 inches, 5-10 inches, 8-20 inches, 8-12 inches, or 10-50 inches. In an embodiment, the height of the payload container is approximately 1-20 inches, 1-10 inches, 2-10 inches, 2-8 inches, 4-8 inches, 4-7 inches, 5-15 inches, or 5-20 inches. In an embodiment, the length of the payload container is approximately 1-100 inches, 1-50 inches, 10-30 inches, 15-25 inches, 18-22 inches, 5-15 inches, or 25-50 inches. In other embodiments, payload container 101 may be sized to accommodate any sized payload for a particular application.

The payload apparatus may be used to drop or release a payload in the payload contained from an aircraft to which the lid is attached. For example, the lid may be fixedly attached to the underside of an aircraft such as an unmanned aerial vehicle or a drone aircraft. The aircraft may land or hover at a low altitude, and then release the payload container as described below. The payload container is then released from the aircraft and the aircraft is free to take-off and fly away having delivered the payload container to its destination. After it is released, the payload container is open on its top as the lid remains with the aircraft. If the cargo within the payload container requires shelter or cover, it may be enclosed in a secondary container within the payload container.

Payload container 101 is selectively attached to lid 102 by way of two latches 103a and 103b. In the example payload apparatus, latches 103a-b are pivotally attached to payload container 101 and pivot from a latched position to an unlatched position. Latches 103a-b are shaped to engage the edge of lid 102 when in the latched configuration illustrated in FIG. 1 and disengage the edge of lid 102 when in the unlatches configuration illustrated in FIG. 3. In this example, latches 103a-b are biased to remain in the latched configuration by a mechanical force such as a spring or other such restoring force. The latches 103a-b can include features (e.g., depressions, grooves) that are shaped or sized relative to lid 102 (e.g., relative to edges of lid 102), in order to engage the lid 102 and pull the lid 102 toward container 101 when in latched position. In one embodiment, to engage the lid 102, the features (e.g., grooves) can wrap around portions of the lid 102 and/or its edges, reaching a top surface of the lid 102 to engage it and pull it toward container 101.

Actuators 104a-b are fastened to lid 102 and, when actuated, push on latches 103a-b to move them from the latched configuration to an unlatched configuration. In this process, actuators 104a-b push against the restoring force acting to keep latches 103a-b in the latched configuration. In an embodiment, actuators 104a-b are electrically-powered linear actuators comprising three telescoping sections. In other embodiments, actuators 104a-b may be any kind of actuator such as, but not limited to, pneumatic actuators, magnetic actuators such as solenoids, or radial actuators. The actuators are selected to be able to generate enough force to overcome the restoring force biasing latches 103a-b in the latched position as well as any static friction that exists between latches 103a-b and lid 102.

Two latches and two actuators are illustrated in this example, but any number of latches and actuators may be included in various embodiments of the payload apparatus. For example, an embodiment may include four latches and four actuators, positioned on the four sides of a rectangular payload container and lid. Another embodiment may include three actuator and latch pairs placed equidistantly around a circular payload container and lid. Some embodiments may include disparate numbers of actuators and latches. For example, an actuator may be positioned and configured to actuate two opposing latches, and embodiments using such an actuator may only include half as many actuators as latches. As another example, a latch may require two actuators to effectively latch and unlatch a payload container from a lid in a two-step process, and embodiments using such a latch and actuator arrangement may include twice as many actuators as latches.

Figure 1A:
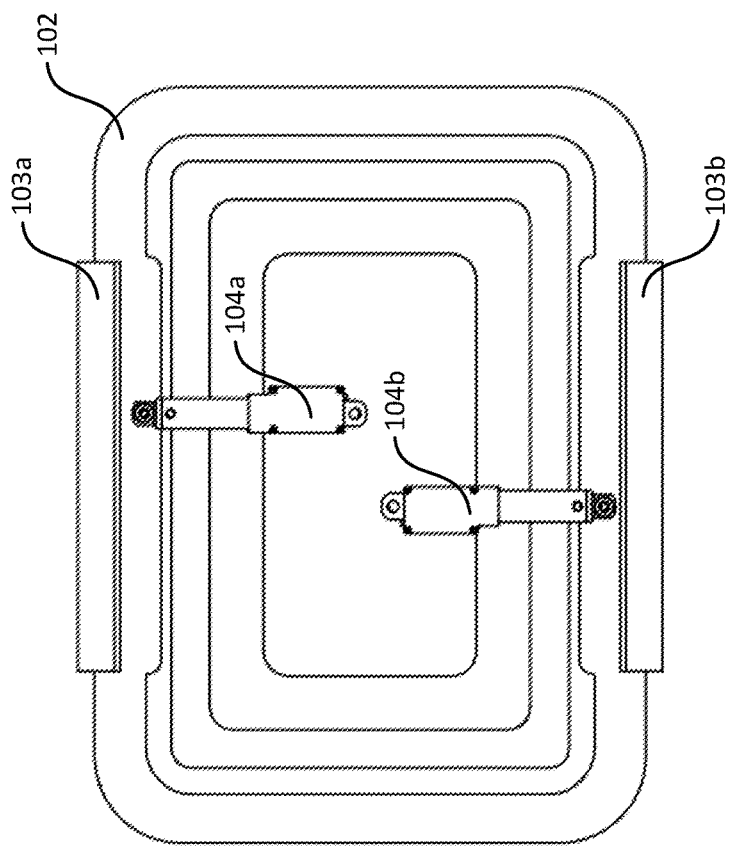

FIG. 1 illustrates an example payload apparatus in a latched configuration. FIG. 1A illustrates a top view of the example payload apparatus and FIG. 1B illustrates a side view of the example payload apparatus. In the configuration illustrated in FIG. 1, payload container 101 is securely attached to lid 102 by way of latches 103a and 103b. As illustrated in FIG. 1A, latches 103a-b engage a substantial portion of two opposing sides of the rectangular-shaped lid 102. In this configuration, actuators 104a-b are in a fully-retracted position in which they do not engage latches 103a-b.

FIG. 2 illustrates the example payload apparatus in an unlatching configuration. FIG. 2A illustrates a top view of the example payload apparatus and FIG. 2B illustrates a side view of the example payload apparatus. The example payload apparatus of FIG. 2 is the same example payload apparatus illustrated in FIG. 1, but in an unlatching configuration. In the unlatching configuration, the example payload apparatus is in the process of releasing payload container 101 from lid 101. In this configuration, actuators 104a-b are partially extended and are engaging latches 103a-b, pivoting latches 103a-b away from lid 102, thereby disengaging latches 103a-b from lid 102.

As actuators 104a-b continue to expand and pivot latches 103a-b further away from lid 102, payload container 101 eventually becomes fully disengaged from lid 102. FIG. 3 illustrates the example payload apparatus in an unlatched configuration. FIG. 3A illustrates a top view of the example payload apparatus and FIG. 3B illustrates a side view of the example payload apparatus. The example payload apparatus of FIG. 3 is the same example payload apparatus illustrated in FIGS. 1-2, but in an unlatched configuration. In this unlatched configuration, payload container 101 is fully disengaged from lid 102, latches 103a-b are fully pivoted outward from payload container 101, and actuators 104a-b are in their fully extended position.

Figure 4:
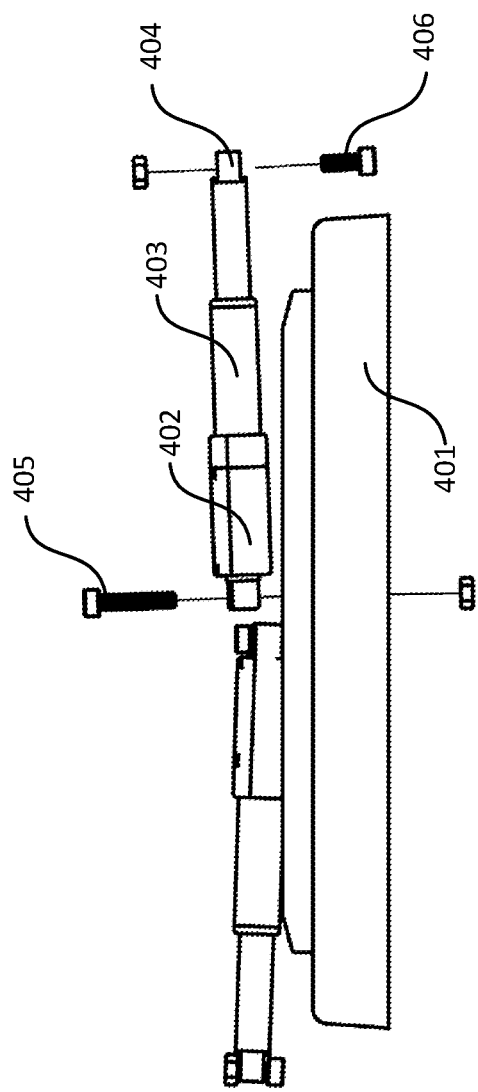
FIG. 4 illustrates an actuator configuration according to an embodiment.

FIG. 4 illustrates an actuator configuration according to an embodiment. The actuator illustrated in FIG. 4 may be used to actuate one or more latches in a payload apparatus such as described above. In the example illustrated in FIG. 4, an actuator comprises three telescoping portions 402, 403, and 404. Other embodiments may include more or fewer telescoping portions. In this example, first telescoping actuator portion 402 is fixedly attached to a payload container lid 401 by fastener 405. First telescoping actuator portion 402 receives second telescoping actuator portion 403, and second telescoping actuator portion 403 receives third telescoping actuator portion 404.

All three telescoping actuator portions 402-404 are slidable along an axis such that the actuator may extend along the axis. A mechanical driver enclosed within the actuator pushes along the axis to expand the actuator and pulls along the axis to contract the actuator. The mechanical driver may be, for example, a screw-driven, electrically operated linear actuator. In another embodiment, the mechanical driver may be a pneumatic piston, for example. Bearings or bushings may be dispensed between the three telescoping actuator portions to maintain rigidity throughout the entire range of motion of the actuator.

At the end of the actuator, third telescoping actuator portion 404 includes a hole through which a latch engagement portion 406 is mounted. In this example, latch engagement portion 406 comprises a threaded screw and nut configured such that the distance the screw extends downward from the actuator is configurable by adjusting the screw. This adjustment allows for setting the engagement the actuator has with a latch. If the latch engagement portion 406 is not extended far enough, it may not engage with a latch as desired. Thus, by adjusting the latch engagement portion 406, one skilled in the art may configure the actuator to effectively engage payload container latches.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways.

Components, or modules, shown in diagrams are illustrative of embodiments of the invention. It shall also be understood that throughout this disclosure that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components.

Reference in the specification to "one embodiment," "an embodiment," "some embodiments," or "embodiments" means that a particular feature, structure, characteristic, or function described in connection with the embodiment is included in at least one embodiment of the invention and may be included more than one embodiment. Also, the appearances of the above-noted phrases in various places in the specification are not necessarily all referring to the same embodiment or embodiments.

The use of certain terms in various places in the specification is for illustration and should not be construed as limiting. Furthermore, it shall be noted that: (1) certain steps may optionally be performed; (2) steps may not be limited to the specific order set forth herein; (3) certain steps may be performed in different orders; and (4) certain steps may be done concurrently.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims.

What is claimed is:

1. A payload delivery system for selectively releasing the payload from a drone-based delivery system, comprising:
    a payload container lid;
    a payload container comprising one or more external walls, enclosing a volume inside the payload container, the payload container having a plurality of latches pivotally affixed to the external walls and outside the enclosed volume, wherein the latches comprise grooves sized to selectively engage the payload container lid, wherein inside surfaces of the grooves wrap around portions of the payload container lid reaching a top surface of the payload container lid external to the enclosed volume and pulling the payload container lid toward the payload container; and
    a plurality of actuators attached to the payload container lid on the top surface external to the enclosed volume, wherein the plurality of actuators are configured to disengage the latches from the payload container lid.

2. The payload delivery system of claim 1, wherein the latches are fully engaged with the payload container lid in a latched configuration, and wherein the latches are fully disengaged from the payload container lid in an unlatched configuration.

3. The payload delivery system of claim 1, wherein the actuators are electrically-operated linear actuators.

4. The payload delivery system of claim 1, wherein the actuators are pneumatic linear actuators.

5. The payload delivery system of claim 1, wherein the plurality of actuators comprise telescoping sections and are configured to disengage the latches by extending the telescoping sections.

6. The payload delivery system of claim 1, wherein the actuators disengage the latches by extending the actuators between an anchor point and the latches.

7. The payload delivery system of claim 1, wherein the payload container and the payload container lid comprise a circular, square, rectangular, trapezoidal or triangular cross section.

8. The payload delivery system of claim 1, wherein the latches are pivotally attached to the payload container and pivot from a latched position to an unlatched position and wherein selectively engaging the payload container lid comprises removably attaching the payload container lid to the payload container, and disengaging the latches from the payload container lid comprises releasing the payload container lid from the payload container.

9. The payload delivery system of claim 1, wherein the latches are shaped to engage edges of the payload container and the actuators further comprise latch engagement portions adjustable to provide contact between the latches and the actuators when the actuators disengage the latches from the payload container.

10. The payload delivery system of claim 1, wherein the latches are biased to be engaged with the payload container lid at rest.

11. The payload delivery system of claim 10, wherein the latches are biased by a mechanical restoring force.

12. A method of payload delivery for selectively releasing the payload from a drone-based delivery system, the method comprising:
    providing a container lid;
    providing a payload container comprising one or more external walls, enclosing a volume inside the payload container, the payload container having a plurality of latches pivotally affixed to the external walls and outside the enclosed volume, wherein the latches comprise grooves sized to selectively engage the payload container lid, wherein inside surfaces of the grooves wrap around portions of the payload container lid reaching a top surface of the payload container lid external to the enclosed volume and pulling the payload container lid toward the payload container,
    wherein the latches are biased with a restoring mechanical force to engage edges of the payload container lid; and
    attaching a plurality of actuators to the payload container lid on the top surface external to the enclosed volume, wherein the actuators are extendable to oppose the mechanical force and disengage the container lid from the container.

13. The method of claim 12, wherein the restoring mechanical force is provided with a spring.

14. The method of claim 12, wherein the actuators are one or more of: electrically-operated linear actuators, pneumatic linear actuators, magnetic actuators, and radial actuators.

15. The method of claim 12, wherein the actuators comprise telescoping sections extendable between an anchor point and the latches.

16. The method of claim 12, wherein the actuators further comprise engagement portions adjustable to provide contact between the actuators and the latches.

17. A payload delivery system for selectively releasing the payload from a drone-based delivery system, the system comprising:
    a payload container lid;
    a payload container, comprising one or more external walls, enclosing a volume inside the payload container, the payload container having means for engaging the payload container lid, wherein the payload container and the payload container lid enclose the inside volume and wherein the means for engaging is pivotally affixed to the external walls and outside the enclosed volume, wherein the means for engaging comprise grooves sized to selectively engage the payload container lid, wherein inside surfaces of the grooves wrap around portions of the payload container lid reaching a top surface of the payload container lid external to the enclosed volume and pulling the payload container lid toward the payload container, wherein the means for engaging is attached to the payload container lid on the top surface external to the enclosed volume; and
    means for disengaging, extendable to disengage the means for engaging from the payload container lid.

18. The system of claim 17, wherein the engaging means comprises means for providing a restoring mechanical force.

19. The system of claim 17, wherein the means for disengaging is attached to the payload container lid on a surface external to the volume.

* * * * *